United States Patent [19]

Duchadeau

[11] Patent Number: 4,496,086

[45] Date of Patent: Jan. 29, 1985

[54] DEVICES WHICH COMPRISE A HELICAL SPRING USED AS CONVEYING, EXTRACTING, QUANTITY-CONTROLLING OR MIXING MEANS

[75] Inventor: Pierre Duchadeau, Sevres, France

[73] Assignee: Pari-Symac, France

[21] Appl. No.: 375,228

[22] Filed: May 5, 1982

[30] Foreign Application Priority Data

May 14, 1981 [FR] France ................................ 81 09624

[51] Int. Cl.³ .............................................. B65G 33/08
[52] U.S. Cl. ..................................... 222/412; 198/659
[58] Field of Search ................ 222/412, 413, DIG. 1; 198/659

[56] References Cited

U.S. PATENT DOCUMENTS

| 351,014 | 10/1886 | Wissler | 198/659 |
|---|---|---|---|
| 1,835,989 | 12/1931 | Hofft et al. | 222/413 X |
| 3,675,367 | 7/1972 | Amburn | 198/657 X |
| 3,684,082 | 8/1972 | Wardell | 222/413 X |
| 3,724,725 | 4/1973 | Stauffer | 222/DIG. 1 X |
| 4,192,418 | 3/1980 | Montgomery | 198/659 |

FOREIGN PATENT DOCUMENTS

| 104888 | 5/1898 | Fed. Rep. of Germany . |
| 1033143 | 7/1953 | France . |
| 1434363 | 2/1966 | France . |
| 2171838 | 9/1973 | France . |
| 55-44447 | 3/1980 | Japan . |

Primary Examiner—F. J. Bartuska
Attorney, Agent, or Firm—Poms, Smith, Lande & Rose

[57] ABSTRACT

A rotating helical coiled spring for conveying, extracting, quantity-controlling or mixing particulate products. A supple material such as a brush is attached to the periphery of the spring and brushes against a rigid wall or tube as the spring is rotated thereby propelling the particulate product in a direction generally parallel to the axis of the spring.

6 Claims, 7 Drawing Figures

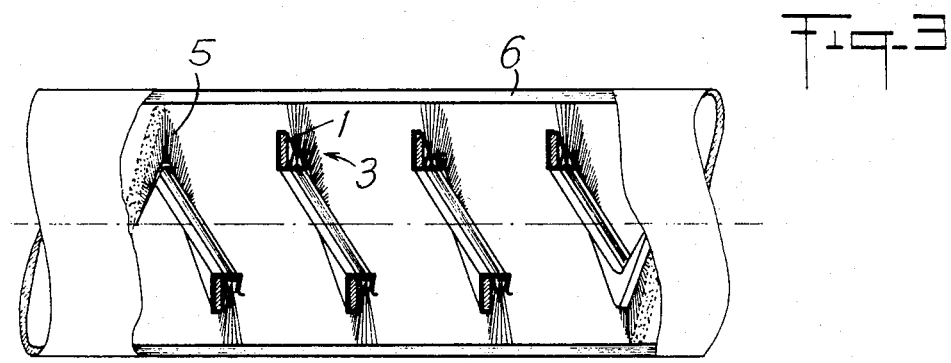
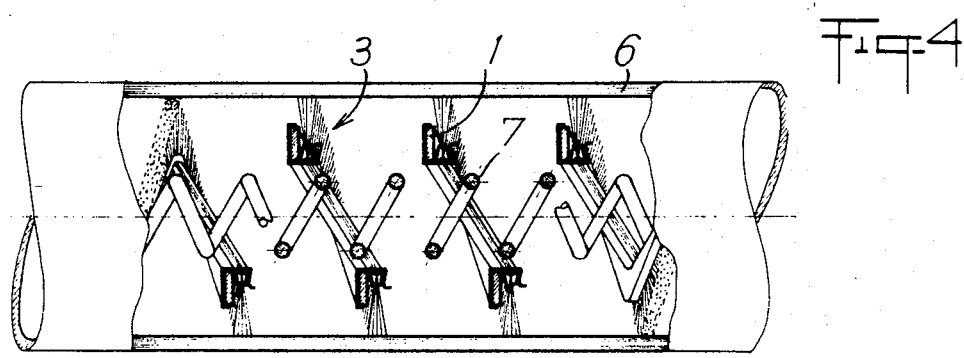
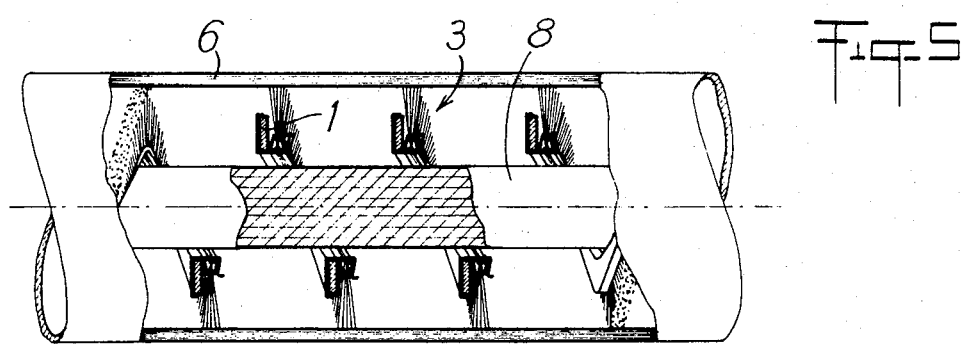

DEVICES WHICH COMPRISE A HELICAL SPRING USED AS CONVEYING, EXTRACTING, QUANTITY-CONTROLLING OR MIXING MEANS

The present invention relates to an improvement to devices comprising a helical spring used as conveying, extracting, quantity-controlling or mixing means.

It is known to use devices equipped with at least one helical spring driven in rotation, and which constitutes either a means for conveying the product, such as described in French Pat. Nos. 1 436 336, 1 199 637 and 70 02362, or a means for extracting the product from a reservoir such as described in French Pat. Nos. 69 20340, 1 582 845, or a means for controlling the quantity of product such as described in French Pat. Nos. 69 38599 and 78 17241.

But the use of such a rotated helical spring can, in some cases, cause the product to break up or to clogg up, thus creating a layer of product between the helical spring and the fixed wall and preventing the rotation of the spring after a certain time of operation. The known devices of this type can be noisy because of the spring contacting with the fixed wall and they can start vibrating with certain products or when empty due to the fact that the spring, when vibrating, presents nodes and loops which in the end jams up the spring and damages it. In the case of only one spring, part of the product stays in the device when this is no longer fed continuously and it is impossible to empty it completely without dismantling it.

With the known devices, it is also possible that relatively larger particles of product are caught between the spring and the fixed wall. When the conveyed product is abrasive, it can be driven with the spring and cause rapid abrasion of the spring and of the container wall.

Certain pulverulent products may be wrongly picked up by the spring and then create archings, and it is the object of the present invention to eliminate these drawbacks by proposing an improved spring device.

The rotary helical spring according to the present invention presents on its periphery a helical member in supple material which is in contact with a rigid wall with respect to which moves the spring.

According to another feature of the invention, the helical member in supple material is constituted by a brush made-up of supple filaments fixed on the periphery of the helical spring and in contact with the rigid wall.

The brush placed on the periphery of the spring prevents the product from infiltrating between the spring and the wall and also from breaking up. In addition, the brush by contacting with the wall of the container prevents the product from clogging, and from impeding the working of the spring. The centering of the spring, owing to the presence of supple filaments in contact with the wall of the container, prevents any noisy contact between the spring and the said wall.

The phenomena of vibrations which had been noted in the known devices are now eliminated, any vibration being damped down by the bristles of the brush. With the spring device equipped on its periphery with a brush, the product is entirely removed from the container without dismantling the latter.

The presence of a brush on the periphery of the spring prevents any particles of product from infiltrating between the spring and the fixed wall of the container and, in the case of abrasive products, it prevents an early wearing out of the container wall and of the spring, the working life of both of which is thus improved. The use of moderately flowing products is helped due to the fact that the brushes prevent arching of the product and facilitate the admission of the product into the conveying apparatus.

In devices dispensing the product through a slot or any other sifting means, the brush provided on the periphery of the spring enables to obtain a better distribution of the product and better results. Finally, the presence of said brush permits a better ventilation of the treated product.

The invention will be more readily understood on reading the following description with reference to the accompanying drawings in which:

FIG. 3 is an axial cross-section of a device composed of a tubular element and of a helical spring improved according to the invention;

FIG. 4 is an axial cross-section of a device constituted by a tubular element containing two concentric helical spring;

FIG. 5 is an axial cross-section of a device constituted of a tubular element containing a helical spring and a central rod;

FIGS. 1 and 2 show an embodiment of a conveying, extracting quantity-controlling or mixing member which is used in different devices according to the invention.

Figure 1:
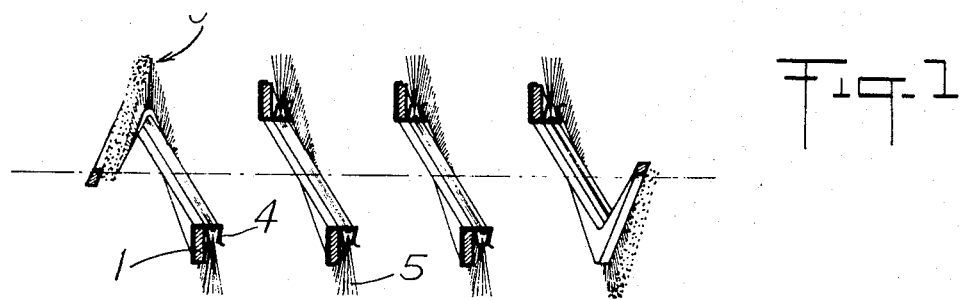
FIG. 1 is an axial cross-section of a helical spring equipped on its periphery with a brush according to the invention.
Figure 2:
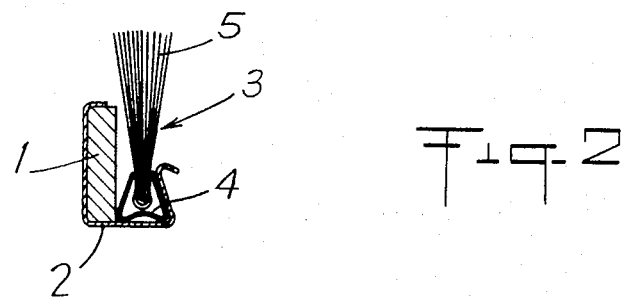
FIG. 2 is a cross-sectional view on a larger scale of a spring equipped with a brush.

The member illustrated in FIGS. 1 and 2 is constituted by a helical spring 1 on which is fixed laterally and by way of fasteners 2 a helically-shaped brush 3 comprising a helical element 4 of U-shaped cross-section in which supple filaments 5 are gripped, which filaments constitute the bristles of the brush and extend along a continuous helical line. Said supple filaments can be made of wire, plastic material or animal or vegetable material.

FIG. 3 shows an embodiment of a product-conveying device which is constituted by a tubular element 6 in which is mounted a helical spring 1 provided on its periphery with a helical brush 3, as described hereinabove. In this particular embodiment, the spring 1 is driven in rotation in known manner by means not shown in the drawing and the supple filaments 5 of the brush are in contact with the inner surface of the tubular element 6.

FIG. 4, shows a variant of embodiment inside which a helical spring 7 is placed inside the spring 1 and co-axially thereto, said spring 1 being equipped with a helical brush 3, the springs 1 and 7 being mounted for rotating in a tubular element 6.

Figure 6:
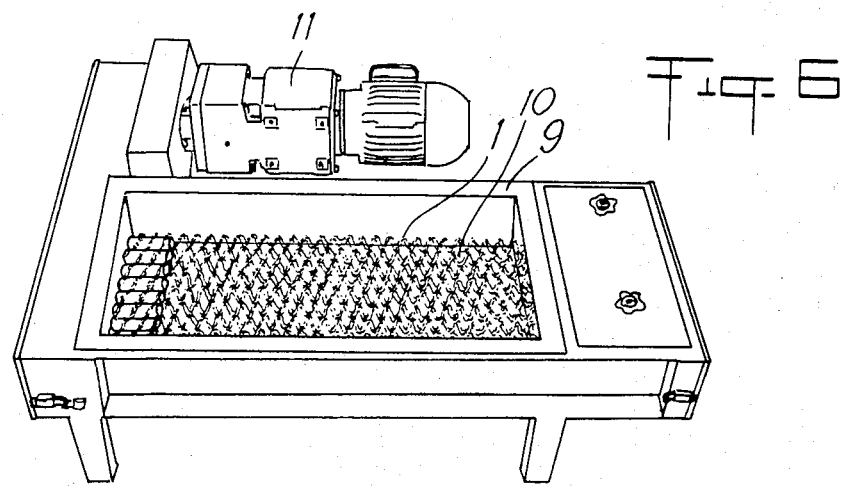
FIG. 6 is a perspective view of an improved extracting device according to the invention.

FIG. 6 shows another product conveying device which comprises a tubular element 6 inside which a spring 1 is mounted for rotation, which spring is equipped with a helical brush 3, the filaments of which are in contact with the inner surface of the said tubular element. Inside said spring 1 and coaxially thereto is placed a rod or tube 8.

FIG. 6 shows a product extracting device which is placed at the base of a silo or reservoir containing a pulverulent product. The device comprises a container 9 open at its upper part and in which are disposed in longitudinally juxtaposed manner helical springs 1 resting on the bottom 10 of the container and driven simultaneously in rotation by driving means 11.

According to the invention, the springs 1 present on their periphery a brush which is in contact with the bottom 10 of the extracting container, as described hereinabove.

Figure 7:
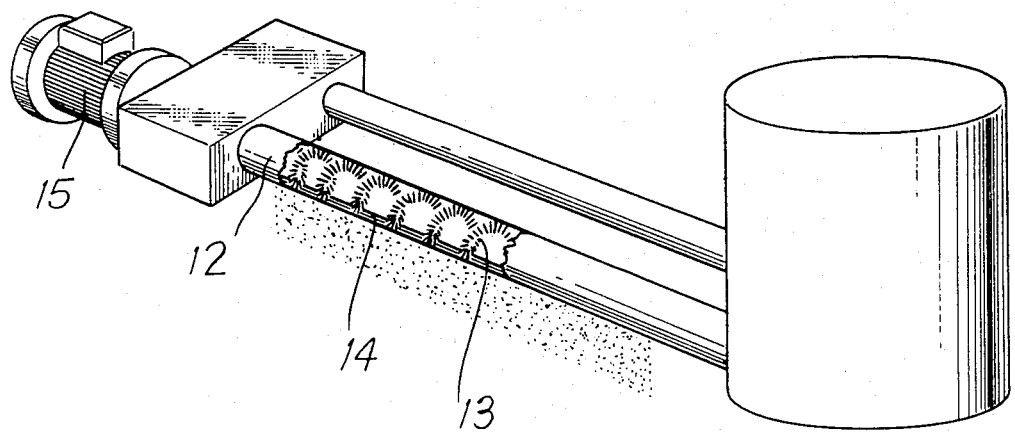
FIG. 7 is a perspective view of an improved dispensing device according to the invention.

FIG. 7 shows a dispensing device which comprises a tubular element 12 in which is rotatably mounted a helical spring 13 driven in rotation by a driving member 15, said spring 13 comprising on its periphery a brush such as described hereinabove and which is in contact with the wall of the tubular element 12, which wall is provided with a slot 14 through which the product is dispensed when the spring moves.

The invention is in no way limited to the description given hereinabove and on the contrary covers any modifications that can be made thereto without departing from the scope thereof.

What is claimed is:

1. In a conveying, extracting, quantity-controlling or mixing apparatus having a rotating helical spring moving with respect to a rigid wall, the improvement comprising:
a helical brush member of outwardly extending supple filaments which are gripped by one of their ends in a helical member of U-shaped cross-section which is fixed laterally on the helical spring and presents the free ends of the supple filaments in contact with the rigid wall.

2. Improvement to devices as claimed in claim 1, wherein the helical member gripping the supple filaments of the brush is secured to the helical spring by means of fasteners.

3. Improvement to devices as claimed in claim 1 wherein the helical spring is mounted for rotation in a tubular element of which the wall is in contact with the free end of the supple filaments of the helical brush mounted on said helical spring.

4. Improvement to devices as claimed in claim 1, wherein the device comprises a helical spring inside which a rod is co-axially mounted, the rod having an outer diameter less than the inner diameter of the spring, said spring and said rod being placed inside a tubular element of which the wall is in contact on the inside with a helical brush fixed on the periphery of the helical spring.

5. Improvement to devices as claimed in claim 1, wherein the device is an extractor placed at the base of a reservoir of product and comprising a container with a flat bottom on which are longitudinally juxtaposed helical springs equipped on their periphery with a helical brush of which the supple filaments are in contact with the bottom wall of the extractor.

6. Improvement to devices as claimed in claim 1, wherein the device is a dispenser presenting a tubular element with at least one orifice to allow the product through and in which is placed a helical spring equipped on its periphery with a helical brush of which the supple filaments are in contact with the wall of the tubular element.

* * * * *